United States Patent
Bonato et al.

(10) Patent No.: US 6,817,207 B2
(45) Date of Patent: Nov. 16, 2004

(54) DEVICE TO PRODUCE ICE-CREAM

(75) Inventors: Alessandro Bonato, Monticello Conto Otto (IT); Giuseppe Fin, Meolo (IT); Sergio Zanolin, Polcenigo (IT)

(73) Assignee: De'Longhi SpA, Treviso (IT)

( * ) Notice: Subject to any disclaimer, the term of this patent is extended or adjusted under 35 U.S.C. 154(b) by 0 days.

(21) Appl. No.: 10/658,944

(22) Filed: Sep. 9, 2003

(65) Prior Publication Data

US 2004/0045311 A1 Mar. 11, 2004

(30) Foreign Application Priority Data

Sep. 9, 2002 (IT) .................................. UD2002A0190

(51) Int. Cl.⁷ ............................................. A23G 9/12
(52) U.S. Cl. .................. 62/342; 165/80.1; 165/163
(58) Field of Search .................. 62/342, 343; 165/80.1, 165/163

(56) References Cited

U.S. PATENT DOCUMENTS

| | | | |
|---|---|---|---|
| 4,205,535 A | * 6/1980 | Maurer | ................. 62/342 |
| 4,392,361 A | 7/1983 | Cavalli | |
| 4,462,462 A | * 7/1984 | Meagher et al. | .......... 165/80.1 |
| 4,535,604 A | 8/1985 | Cavalli | |
| 4,545,216 A | * 10/1985 | Cavalli | ................. 62/343 |
| 4,573,329 A | 3/1986 | Cavalli | |
| 4,920,761 A | 5/1990 | Bukoschek et al. | |

FOREIGN PATENT DOCUMENTS

| | | |
|---|---|---|
| DE | 38 06 508 A1 | 3/1988 |
| EP | 0 129 706 A2 | 1/1985 |
| FR | 2 447 703 | 8/1980 |
| FR | 2 491 607 | 4/1982 |
| GB | 2 187 110 A | 9/1987 |
| JP | 63116649 A | 5/1988 |
| JP | 64-16557 A | 1/1989 |
| JP | 01247044 A | 10/1989 |
| JP | 02031650 | 2/1990 |
| JP | 2-100634 A | 4/1990 |
| JP | 2-145153 A | 6/1990 |
| JP | 3-19651 A | 1/1991 |
| JP | 03019652 A | 1/1991 |
| JP | 3-147748 A | 6/1991 |
| JP | 01000328 A | 1/2001 |
| JP | 2002-13847 A | 1/2002 |

* cited by examiner

Primary Examiner—William E. Tapolcai
(74) Attorney, Agent, or Firm—Akin, Gump, Strauss, Hauer & Feld, L.L.P.

(57) ABSTRACT

Device to produce ice-cream wherein there is an outer container (11), a cover (26), an inner container (14), a mixing blade (20), and an evaporator coil (21) located in cooperation with the bottom (17) of the inner container (14), through at least a contact surface (27). The inner container (14) is axially mobile to assume at least an axial working position correlated to the position of the cover (26) when it is installed on the outer container (11), and is pressed elastically against the evaporator coil (21) by spring means (22) located under the evaporator coil (21).

17 Claims, 3 Drawing Sheets

DEVICE TO PRODUCE ICE-CREAM

FIELD OF THE INVENTION

The present invention concerns a device to produce ice-cream for ice-cream producing machines.

The present invention is applied to ice-cream producing machines of a domestic or semi-professional type.

BACKGROUND OF THE INVENTION

Machines of a domestic or semi-professional type are known, wherein the container where the ice-cream is formed cooperates with a mixing blade and with means to transfer the cold, or heat absorption means.

The mixing blade takes motion from drive means associated with the cover.

According to a variant, the blade takes motion from drive means located under or at the side of the container and connected to the mixing blade by a drive shaft which passes axially to the container with a cylindrical design. The drive means can be electric or manually driven.

This type of machine, in relation to the chain of cold, has developed different design philosophies in relation to the cooperation of the heat absorption means with the container of the products which are transformed into ice-cream.

A first design philosophy provides a fixed evaporator coil, that is, a coil wherein the temperature of the compressed gas goes down as it expands, which is cylindrical in shape; this coil surrounds the container, leaving an interspace between the coil and the container for the operations to insert and remove the container itself.

This type of solution does not achieve an optimum heat exchange between the coil and the container, given the ring of air which, in fact, is greatly insulating.

To improve the transfer of cold, it was then provided to fill, on each occasion, the ring of air with alcohol or other liquid which does not freeze at the normal working temperatures of the machine.

Apart from the ever-present danger of fire, it is certainly not easy or simple to insert the container into a bath of alcohol. Moreover, there is always the danger of overflow.

A second design philosophy has conceived of an elastic evaporator coil equipped with clamping means, as shown for example in U.S. Pat. No. 4,573,329 and in EP-A-129.706. By acting on the clamping means the evaporator coil opens or closes radially, so that it is possible to insert (or remove) the container by extracting it axially from the coil. When the container is inserted into the evaporator coil, the clamping means are activated and the evaporator coil contracts radially, surrounding, and closely connecting with, the peripheral cylindrical body of the container.

This system guarantees an optimum heat absorption, but it has the drawbacks of the high cost of the evaporator coil and of the fact that it is easily damaged even by a careful user, and even more so by an inattentive user.

Damage to the coil can also entail a dispersion into the environment of dangerous refrigeration gases.

A system is also known, from JP-A-02-145153, which provides that the container is pressed elastically against the rotating mixing blade, by a coil located below.

A proposal is also known, from U.S. Pat. No. 4,535,604, wherein it is provided that the container is held elastically pressed downwards by upper spring means, so that the lower flat part, which connects with the vertical cylindrical part, is in contact with a copper plate, of limited thickness and deformable.

The copper plate is in contact with the coil of cylindrical tubes which involves both the flat part and also the part that connects to the vertical cylindrical part of the container.

This solution is very interesting and advantageous, but it does include some disadvantages. First of all the heat exchange from the plate to the cooled tubes is limited, given the limited contact. Moreover, the presence of the spring located above creates problems of cleaning and safety for the user.

Furthermore, the presence of circumferential blades, necessary to provide the container with the necessary pressure, located laterally or in the upper part of the container, creates not only difficulties in use, but also danger for the user. To this it must be added that, due to its very nature, the elastic mass located under the coil tends to memorize the deformation, and this memorization is accentuated over time. This automatically entails a loss of adherence.

Furthermore, with the system disclosed by US '604 it is possible to apply pressures of only a few kilograms on the pressure blades, which is not sufficient for a correct contact of heat transmission.

Applicant therefore set himself the problem of finding an optimum solution to these problems and surprisingly found, and also studied, experimented and embodied the present invention.

SUMMARY OF THE INVENTION

The present invention is set forth and characterized in the main claim, while the dependent claims describe other innovative characteristics of the invention.

The purpose of the present invention is therefore to improve the performance in the cold chain in correspondence with the heat exchange between the evaporator coil and the container, at the same time achieving an optimum evaporator coil. The invention therefore tends to overcome known problems by achieving a very simple, low cost device, easy to use, simple to clean, without dangers for the user, which is advantageous even for a poorly qualified operator, simple and quick to maintain with little probability of damage.

According to the invention, the system to absorb the heat between the container and the evaporator coil is achieved according to the general principles of US '604 but with new and innovative concepts.

According to the invention, the coil cooperates with spring means that, in a preferential embodiment, are arranged below a supporting base for the coil. The spring means are able to supply, in their entirety, from 200 to 600 kilograms of total thrust on containers having a diameter of about 130÷160 mm.

The container, when the cover is on, assumes a working position wherein it is thrust elastically against the coil, thanks to the presence of the spring means.

In an advantageous embodiment, the supporting base of the coil is made of plastic.

According to a variant, the cold is transferred through a circular element, for example a toric ring, which affects the bottom of the container.

According to another variant, the circular element also affects the peripheral edge of the container.

The invention provides that the bottom of the container is substantially plane and made of the same material as the rest of the container.

According to a variant, the bottom of the container has a layer of highly conductive material (copper, aluminum or suchlike) the function of which is not only to improve the heat exchange but also to make it uniform.

According to another variant, at least the outer bottom of the container has a series of rings, which cooperate with mating rings present in the evaporator coil, in order to increase the exchange surface.

In this case, one solution provides that the rings are obtained in an additional material applied on the bottom of the container.

The rings can be V-shaped, wavy, or of any other type; only the fact that they serve to increase the exchange surface is relevant.

According to another variant, the bottom of the container is arc-shaped, or like an inner or outer V, or according to another development tending to increase the surface of contact.

According to another variant, the connecting edge between the bottom of the container and the vertical wall of the container cooperates with the evaporator coil.

According to a variant, the coil is a tube with a thickness of between 0.2 and 0.6 mm. The supporting base has a smooth supporting surface for the coil; according to a variant, the supporting surface is shaped in the shape of the coil.

According to a variant, once the coil is positioned, it is subjected to heading which generates at least a substantially plane contact surface on the upper part of the coil, thus improving the support. Advantageously, the heading generates two contact surfaces, one on the upper part and one on the lower part of the coil.

According to the invention, one contact surface is obtained by reducing the height by a value of between 5% and 20%.

According to one embodiment of the invention, between the container and the coil there is an intermediate plate, made of copper or aluminum, or iron, or plastic material; obviously, the terms copper, aluminum and iron also include the relative alloys.

The thickness of the intermediate plate is between 0.1 and 0.6 mm, also depending on the material used to make it.

According to the invention, the mixing blade not only performs the known function of mixing and introducing air into the ice-cream, but also the function of continuously raising the material, so that the cold transmitted to the bottom of the container and, from this, to the material in contact, is continuously carried upwards with a progressive uniformization of the temperature in the product. According to a variant, the mixing blade is shaped so as to cooperate in close proximity with the bottom of the ice-cream container.

Applicant has also found that the size of the container, that is, the ratio between the usable inner diameter and the height of the level of product which can be obtained (that is, the ice-cream) improves the performance of the device according to the invention.

According to a variant of the invention, this ratio is between 0.30 and 0.50, advantageously between 0.38 and 0.42.

According to the invention, also considering that domestic or semi-professional ice-cream producing machines suffer from natural vibrations, the contact between the intermediate plate with the container and the evaporator coil must always be kept constant and this constant contact is maintained by a conductive paste or other suitable plastic material, located in cooperation with the coil.

According to the invention, the contact between the container and the plate-coil system is maintained elastically due to the elastic thrust towards the container of the evaporator coil while the container remains fixed, in the working phase.

According to the invention, the evaporator coil deforms elastically according to the thrust that it receives towards the container; this improves the heat yield.

According to another variant, the coil is incorporated into a melted material, such as copper, aluminum or suchlike, or into said conductive paste, in order to improve the distribution and uniformity of the cold.

BRIEF DESCRIPTION OF THE DRAWINGS

These and other characteristics of the present invention will become apparent from the following description of a preferential form of embodiment, given as a non-restrictive example with reference to the attached drawings wherein.

DETAILED DESCRIPTION OF THE INVENTION

Figure 1:
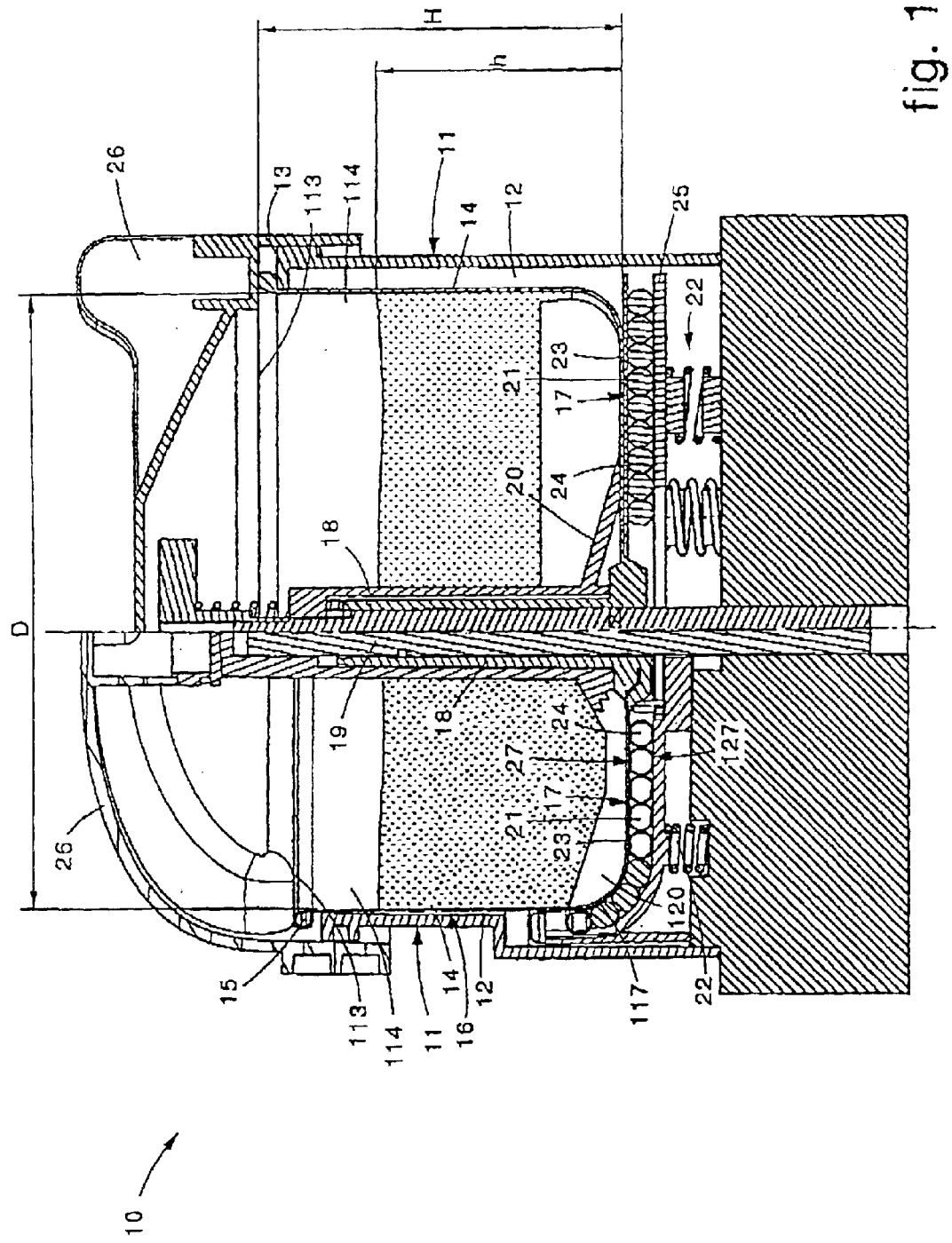
FIG. 1 shows two practical embodiments of the invention in vertical section.

In FIG. 1, which represents, in two different formulations, the part of the ice-cream producing machine to which the invention is applied, the device 10 can be seen; it is composed of a containing unit 11, or outer container, having a housing compartment 12, a supporting edge 13, a supporting and contrasting edge 113 and a cover 26.

In the housing compartment 12, and cooperating with the supporting edge 13 and with the cover 26, there is an inner container 14, hereafter simply container, having a positioning edge 15, a cylindrical body 16, a bottom 17 and a guide tube 18. In this case, the bottom 17 is flat and connects with the cylindrical body 16. The container 14 includes an inner compartment 114.

The drive shaft 19 moves and rotates inside the guide tube 18, driven by drive means not shown here since they are already known, which gives motion to the mixing blade 20.

In the case shown, the bottom 17 is flat on the outside and cooperates with an evaporator coil 21 and with a base 25, through mating contact surfaces, upper 27 and lower 127. The upper contact surface 27 is pressed against the bottom 17 of the container 14 by a plurality of elastic means 22, in this case helical springs, which rest on the bottom of the housing compartment 12.

The evaporator coil 21, in this case, consists of a supporting and transmission plate or foil 23, a coil element 24 and a base or support 25, heat insulated towards the bottom.

The elastic means 22 press on the base 25.

The coil element 24 is connected to the refrigeration system of the machine.

In this case, between the plate 23 and the base 25, according to the invention, material with a high coefficient of heat conduction can be inserted which fills all the spaces left free by the coil element 24.

In the case of the embodiment on the right in FIG. 1, the evaporator coil 21 operates only on the bottom 17.

In the case of the embodiment on the left in FIG. 1, the evaporator coil 21 also operates on the rounded edge 117 of the container 14.

In both cases, the plate or foil 23 is made of heat conductive material with a thickness of between 0.1 and 0.6 mm, advantageously 0.3 mm, so as not to impede the heat exchange and at the same time make it possible to clean the compartment 12.

The base or support 25 is advantageously made of plastic.

The coil element 24 is made of copper pipe with a thickness of between 0.2 and 0.6 mm, advantageously 0.4 mm, in order to improve the heat exchange.

The coil element 24, after being conformed according to the geometric development of the exchange surface of the container 14, can be subjected to a heading action able to create at least an upper contact surface 27, and advantageously a lower contact surface 127 too.

The contact surfaces 27, 127 include a plane segment which increases the heat exchange surface.

The springs 22 can be metal or plastic material and can consist of a plurality of ring-shaped elements, or of a single ring-shaped element; they achieve an overall thrust of between 20 and 60 kg, advantageously 35÷45 kg.

When the container 14 is in its seating and the cover 26 is in position, as a result of this thrust, together with the thickness of the tube, the coil element 24 deforms in an elastic field, guaranteeing an improved contact.

The drive shaft 19 is connected at the upper part in a known manner and can be removed from the mixing blade 20.

The mixing blade 20 has a scraper fin 120 that cooperates with the part of the inner compartment 114 that is directly involved in the heat exchange, in order to prevent the formation of ice.

The cover 26 is anchored to the outer container 11 by means of a rotation system which provides one or more approaching ramps in order to simplify and make closing less difficult for the operator.

The approaching ramps determine the reciprocal axial position of the cover 26 with respect to the outer container 11. The operator can therefore determine the reciprocal position of the outer container 11 and the cover 26. This means that, in relation to the conformation of the ramps, that is, the circumferential position of the cover 26 with respect to the ramps, a greater or lesser compression is determined of the container 14 on the evaporator coil 21 and hence a greater or lesser adhesion between the reciprocal contact surfaces.

Figure 2A:
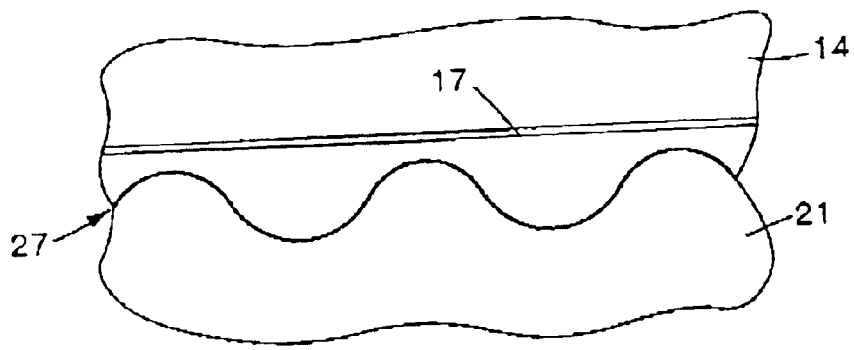
FIGS. 2a, 2b and 2c show some possible conformations in section of the possible rings present between the mating contact surfaces, said rings being obtained in additional material.
Figure 2B:
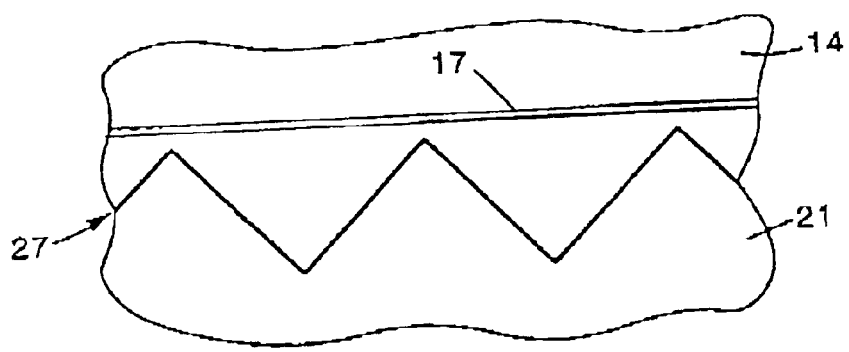
Figure 2C:
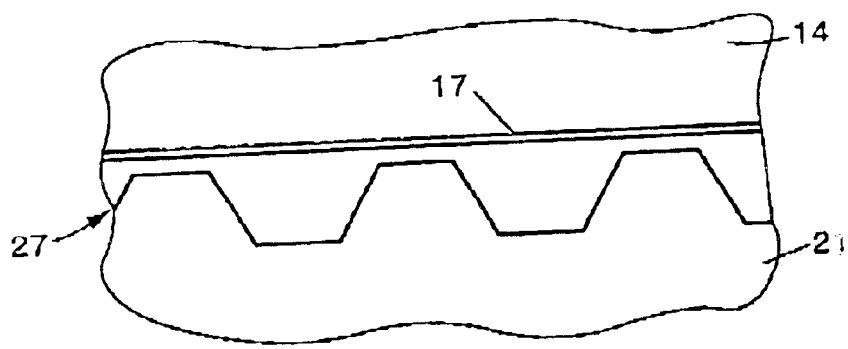
Figure 3A:
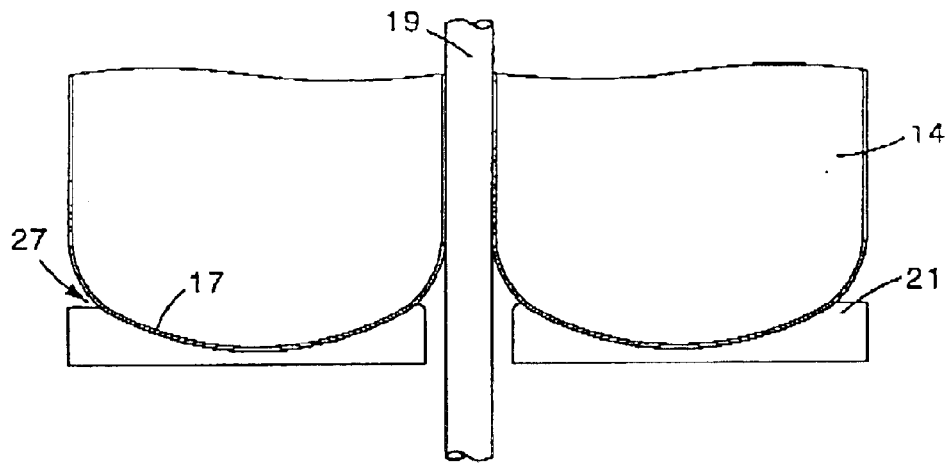
FIGS. 3a, 3b and 3c show some possible conformations of the bottom of the container defining mating contact surfaces.
Figure 3B:
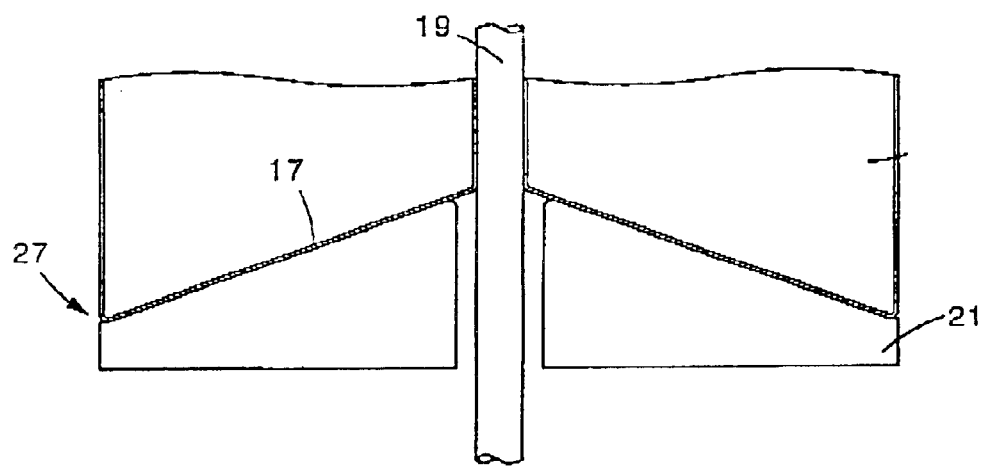
Figure 3C:
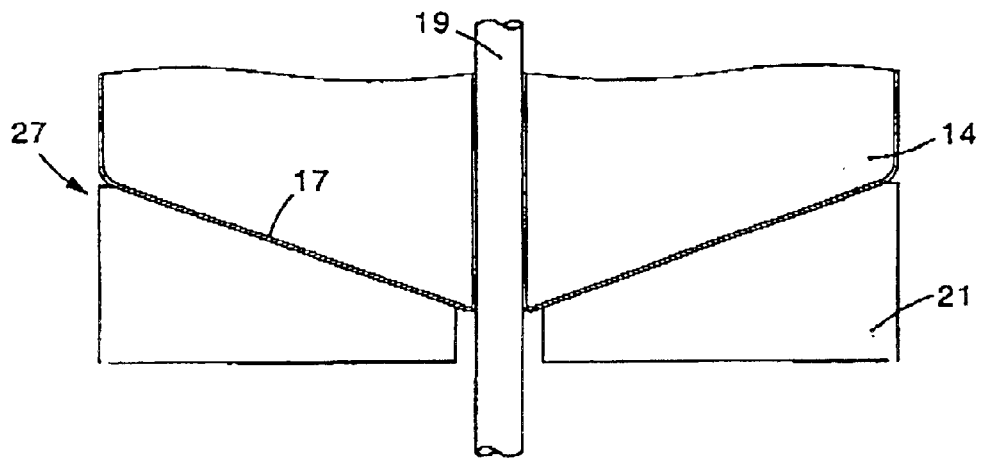

According to the variant FIGS. 2 and 3, the coupling between the bottom 17 of the container 14 and the mating upper contact surface 27 of the coil 21 can assume various forms, such as rings having a geometric profile (wavy, V-shaped, etc.) (FIGS. 2a and 2b), arc-shaped (FIG. 3a), inner V-shaped (FIG. 3b) or outer V-shaped (FIG. 3c).

In this case, to give an example, the container 14 has the following ratios if we assume the diameter D as 1; H, that is, the total height of the container is 0.55; h, that is, the usable height for the level of ice-cream is between 0.30 and 0.50, advantageously between 0.38 and 0.42, in this case 0.37.

Variants of an artisan nature can be applied to the invention.

It is clear however that modifications and/or additions of parts can be made to the device 10 as described heretofore, without departing from the field and scope of the present invention.

What is claimed is:

1. Device to produce ice-cream applied to ice-cream producing machines of a domestic or semi-professional type which cooperates with a refrigeration unit and wherein there is an outer container (11), a cover (26), an inner container (14), a mixing blade (20), an evaporator coil (21) to remove heat from the inner container (14) and, through this, from the material present therein, the mixing blade (20) being associated with a drive shaft (19) driven in rotation by drive means, wherein the evaporator coil (21) is located in cooperation with the bottom (17) of the inner container (14), through at least a contact surface (27), characterized in that said inner container (14) is axially mobile to assume at least an axial working position correlated to the position of the cover (26) when it is installed on the outer container (11), said inner container (14) being pressed elastically against the evaporator coil (21) by spring means (22) located under the evaporator coil (21).

2. Device as in claim 1, characterized in that the mating contact surfaces (27) of the bottom (17) and of the evaporator coil (21) are flat.

3. Device as in claim 1, characterized in that the mating contact surfaces (27) of the bottom (17) and of the evaporator coil (21) have a plurality of rings having a geometric profile (wavy, V-shaped, etc.).

4. Device as in claim 1, characterized in that the mating contact surfaces (27) of the bottom (17) and of the evaporator coil (21) have an arc-type development.

5. Device as in claim 1, characterized in that the mating contact surfaces (27) of the bottom (17) and of the evaporator coil (21) have a V-shaped development (inner or outer).

6. Device as in claim 1, characterized in that the diameter of the bottom (17) is in ratio to the height occupied by the ice-cream in the inner container (14) inside a range which goes from about 0.30 to about 0.50, advantageously from about 0.38 to about 0.42.

7. Device as in claim 1, characterized in that the evaporator coil (21) comprises a coil element (24) incorporated in a material with a high coefficient of heat transmission.

8. Device as in claim 1, characterized in that the mixing blade (20) is conformed so as to thrust upwards the material present in the inner container (14).

9. Device as in claim 1, characterized in that said evaporator coil (21) includes at least a supporting base (25) supporting and positioning said coil element (24) by means of a relative lower contact surface (127), said spring means (22) being positioned between said supporting base (25) and a fixed surface solid with said outer container (11).

10. Device as in claim 1, characterized in that said coil element (24) has a thickness of between 0.2 and 0.6 mm.

11. Device as in claim 10, characterized in that said coil element (24) has a thickness of about 0.4 mm.

12. Device as in claim 1, characterized in that said coil element (24) has at least a substantially plane upper contact surface (27).

13. Device as in claim 1, characterized in that said coil element (24) has at least a substantially plane lower contact surface (127).

14. Device as in claim 1, characterized in that said coil element (24) is able to be elastically deformed when it is pressed by said inner container (14) arranged in the working position.

15. Device as in claim 1, characterized in that the elastic pressure, generated by said spring means (22) between the evaporator coil (21) and the bottom (17) of the inner container (14), is between 20 and 60 kg.

16. Device as in claim 1, characterized in that, between said coil element (24) and said bottom (17) of the inner container (14), the evaporator coil (21) has a plate or foil (23) made of heat conductor material.

17. Device as in claim 16, characterized in that said plate or foil (23) has a thickness of between 0.1 and 0.6 mm, advantageously about 0.3 mm.

\* \* \* \* \*